Jan. 28, 1958 W. L. WALTON 2,821,419
ROD END LOCKING ARRANGEMENT
Filed Jan. 19, 1954
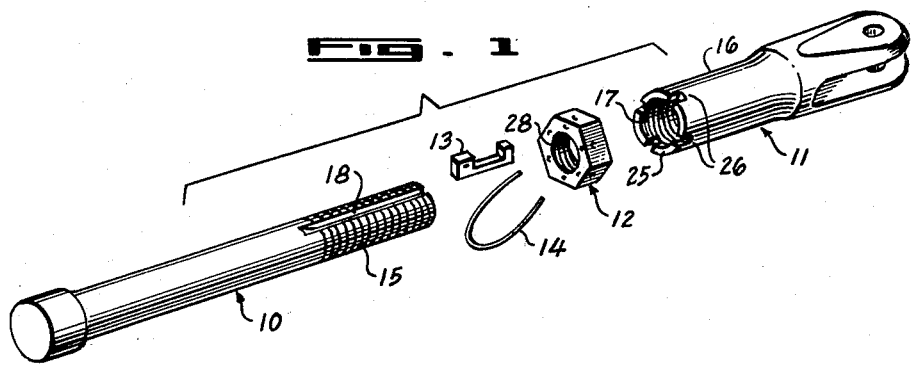
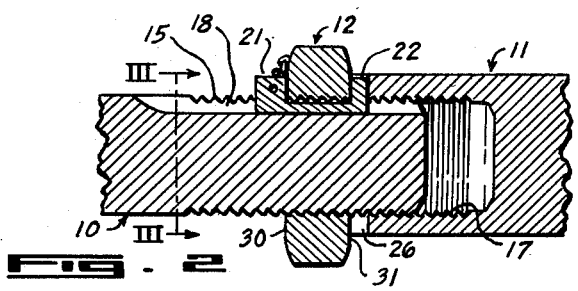
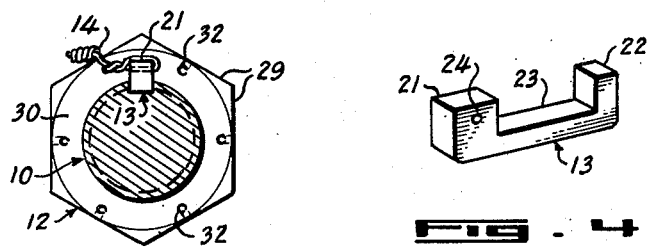
INVENTOR:
William L. Walton
BY
ATTORNEY

United States Patent Office 2,821,419
Patented Jan. 28, 1958

2,821,419

ROD END LOCKING ARRANGEMENT

William L. Walton, Fort Worth, Tex., assignor, by mesne assignments, to General Dynamics Corporation, a corporation of Delaware Application January 19, 1954, Serial No. 404,901

3 Claims. (Cl. 287—62)

This invention relates generally to locking devices and more particularly to an improved arrangement for positively securing rod ends to actuator members.

In the operation of aircraft, it is extremely important for the obvious reason of safety that the various actuator accessories, which effect extension and retraction of such elements of the aircraft as landing gear and control surfaces, perform their required functions reliably and efficiently. Dangerous situations arise when the rod end connections to such actuators inadvertently become loosened or disconnected by reason of a faulty interconnection between these elements; loss of control over the component desired to be actuated can readily result in crashing and destruction of the airplane.

It is therefore the primary object of the present invention to provide an improved locking arrangement between an actuated element and an actuating element.

Another object of this invention resides in the provision of a novel assembly, including a nut and a lock member, for maintaining a positive interconnection between a threaded member and a member adapted to receive the threaded member.

Another object of this invention is to provide a means of interconnecting two elements which embodies a new arrangement of parts whereby a reliable and safe assembly is effected and which is characterized by simplicity and ease of assembly of the parts.

Other objects and features of the present invention will be readily apparent to those skilled in the art from the following description made in connection with the appended drawings in which:

Figure 1 is an exploded perspective view of a locking arrangement in accordance with the present invention.

Figure 2 is a partial sectional view of the parts of an assembly.

Figure 3 is a sectional view along line III—III of Figure 2; and

Figure 4 is a perspective view of the lock member.

Referring now to the drawings wherein a typical exemplification of the invention is illustrated which embodies an actuating member 10, an actuable member 11, a nut 12, a lock member 13 and a wire element 14.

The actuating member 10, solely for purposes of illustration of the present invention, here assumes the form of a piston rod having its outer end exteriorly threaded as at 15, which piston rod it is assumed comprises an element of an actuator accessory which may be located in an airplane for control purposes. It is therefore understood that actuating member 10 is not required to be in the particular form of a piston rod. Actuable member 11, as shown, is in the form of a clevis which is adapted to be connected to an operable element such as a flap or other control surface of an airplane. As illustrated, clevis 11 is provided with a cylindrical shank 16 having an interiorly threaded recess or concavity 17 in the end thereof. Again, the employment of a clevis in the combination of the present invention is merely for purposes of illustrating the invention. Rather than being of clevis form the actuable member 11 could readily be a rod or tube.

Essentially, therefore, the present invention contemplates a pair of elements which are adapted to be interconnected, either of which elements will have or will embody a rod portion with exterior threads and the other of which will include a portion with an interiorly threaded recess adapted to accept the threaded rod portion.

Returning now to the actuating member or piston rod 10, it is seen that its exteriorly threaded portion 15 has a keyway or groove 18 cut therein which extends from the outer end of the rod in the direction of the longitudinal axis of rod 10. Keyway 18 is adapted to slidably receive the lock member or key 13 which is of generally U-shape having spaced legs 21 and 22 connected by a bight portion 23. Lock member 13 is adapted to be fitted onto nut 12 and the space between legs 21 and 22 of lock member 13 is such that the height of the nut 12 can be accommodated in this space so that one leg will lie positioned adjacent one end face of the nut and the other leg will lie adjacent the opposite end face. Legs 21 and 22 are of sufficient height that when the lock member 13 is disposed within keyway 18 with its bight portion 23 resting on the base surface of the keyway a portion of each leg will project above the surface of the rod 10. The purpose of having legs 21 and 22 of a height as described and of having a spacing between these legs as described therebetween will be further discussed hereinafter. Leg 21 in that portion thereof which extends above the surface of rod 10 is provided with a transverse through opening 24 to permit the insertion of the lock wire element 14.

Shank 16 of clevis 11 at its outer end surface 25 is provided with an annularly arranged series of notches 26 which lie in surrounding relationship to the interiorly threaded recess 17 formed in shank 16. The width of each of the notches 26 is such as to accommodate the width of leg 22 of lock member 13 for a purpose to be described.

Nut 12 is formed with a centrally threaded opening 28 to permit it to be fitted upon threaded end 15 of rod 10. Nut 12, as shown is of polygonal form having a plurality of flat faces 29 which accommodate the usual tightening tool and having end faces 30 and 31. Nut 12 is also provided with a series of openings 32, each of which passes in an angular path from a flat face 29 of the nut to exit at the end face 30 of the nut. Openings 32 are adapted to receive wire element 14 for a purpose to be described.

In effecting the desired interconnection between piston rod 10 and clevis 11 the lock member 13 is first fitted into central opening 28 of the nut 12 with its legs 21 and 22 positioned exteriorly of the nut to over-lie respectively the opposite end-faces 30 and 31 thereof. Nut 12 is then run onto the threaded end 15 of rod 10, with lock member 13 fitting into keyway 18 and slidably moved therealong by nut 12 as this nut is rotated. After the nut 12 has been located on rod 10 at the desired point adjacent the lower end of the threaded portion 15 of rod 10 the clevis 11 is then screwed onto threaded portion 15, with threaded portion 15 being run into internally threaded recess 17 of clevis 11 until the desired relative length of piston rod and clevis is attained and with one of the notches 26 in the end of clevis shank 16 axially aligned with the keyway 18. It is obvious that the provision of a plurality of notches 26 on clevis 11 permits a closer approach to be made to achieving the desired over-all length of the assembly then would be possible if but one notch 26 were afforded. Nut 12 is then backed on threaded portion 15 until its end face 31 is tightly abutted or jammed against the end 25 of clevis 11. In this operation, it is apparent that lock member 13 will be moved longitudinally by nut 12 and leg 22 of lock member 13 will be carried into the notch 26 which is in alignment with keyway 18 of rod 10. With leg 22 of lock member 13 disposed within notch 26 and the main body of lock member 13 simultaneously disposed in keyway 18 of rod 10, rotation of clevis 11 relative to rod 10, obviously, is prevented. To hold nut 12 in place and prevent it and lock member 13 from inadvertently travelling down rod 10 and thereby break the engagement of lock member 13 with clevis 11 wire element 14 is passed through opening 24 in leg 21 and then through one of the adjacent apertures 32 in nut 12. The ends of the wire 14 are then twisted together, as shown in Figure 3, to secure nut 12 against rotation. Since nut 12 cannot rotate lock member 13 cannot move axially and will remain with its leg 22 fitted within notch 26 of clevis 11.

With nut 12 secured by wire 14 against rotation and with the main body of lock member 13 disposed within keyway 18 and with leg 22 of lock member 13 positioned within a notch 26 of clevis 11 and held therewithin by the secured nut 12 the piston rod 10 and clevis 11 are effectively and positively locked in end-wise connected relationship, there is no possibility of inadvertent rotation of the various elements relative to one another.

To disconnect clevis 11 from piston rod 10 it is necessary only to remove the wire element 14 and rotate nut 12 down rod 10, this withdraws leg 22 of lock member 13 from notch 26 of clevis 11. After this withdrawal clevis 11 can then be unscrewed. Nut 12 and lock member 13 will remain in assembly on threaded portion 15 of rod 10. The ability of being able to retain nut 12 and lock member 13 upon rod 10 after clevis 11 is disconnected is an additional advantage of the present arrangement since it prevents loss of the nut or the locking element when it becomes necessary to service the actuator.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. In combination, a rod having a threaded portion at one end, a member having an internally threaded recess adapted to be connected to said threaded end portion, locking means axially slidably mounted on said threaded end portion of said rod and adapted to be positioned for positive engagement with said rod and said member to prevent relative rotative movement therebetween, and means rotatably mounted on said threaded end portion of said rod for engagement with said locking means whereby reverse rotation of said last-mentioned means toward said end of said rod serves to urge said locking means slidably into said positive engagement with said rod and said member.

2. The combination with a rod having a threaded portion at one end and a longitudinally extending keyway at said threaded end portion, of an axially extending member, said member having an internally threaded recess at one end adapted to be threaded upon the end of said threaded end portion, said member further having a notch in said one end, a key disposed within said keyway and adapted to have a portion of itself projected within said notch to lock said recessed member against rotation relative to said rod, and means mounted upon said rod for urging said key toward said end of said rod and into engagement with said notch to thereby prevent relative rotation between said rod and said member.

3. The combination with a rod having a threaded end portion and provided with a longitudinally extending keyway at said threaded end portion, of a member to be connected to said rod, said member having an internally threaded recess adapted to engage said threaded end portion, said recessed member further having a notch in its end adapted to align with said keyway when said recessed member is threaded upon said rod, a lock member adapted for slidable movement within said keyway, said lock member having spaced legs, one of said legs being adapted to fit within said notch thereby to secure said member against rotative movement relative to said rod, a nut adapted for rotatable mounting on said threaded end portion of said rod between said legs of said lock member, said nut and said lock member adapted to be first threaded upon said threaded end portion, said member adapted to be next threaded upon said threaded end member whereby said nut may be threadably rotated toward the end of said rod to carry said one leg of said locking member into said notch, and means for restraining said nut and said lock member against relative movement.

References Cited in the file of this patent

UNITED STATES PATENTS

| 895,335 | Brown | Aug. 4, 1908 |
| 916,298 | Gifford | Mar. 23, 1909 |
| 996,540 | Thomshaw | June 27, 1911 |
| 1,561,507 | Clark | Nov. 17, 1925 |
| 2,550,969 | Carr | May 1, 1951 |